Feb. 4, 1936.  J. A. GUYER ET AL  2,029,317
GAS MAKING APPARATUS
Filed March 19, 1932  2 Sheets-Sheet 2
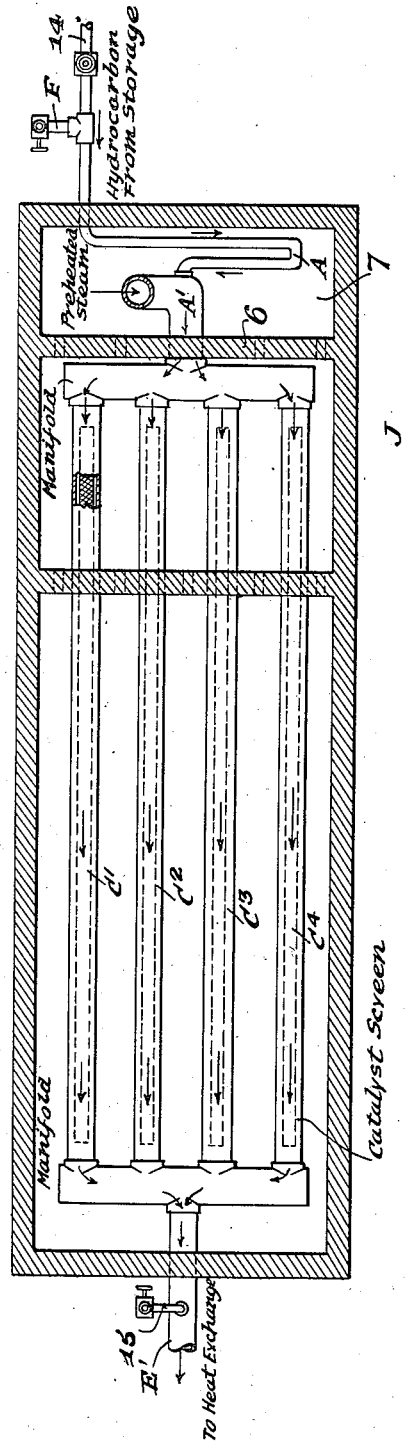
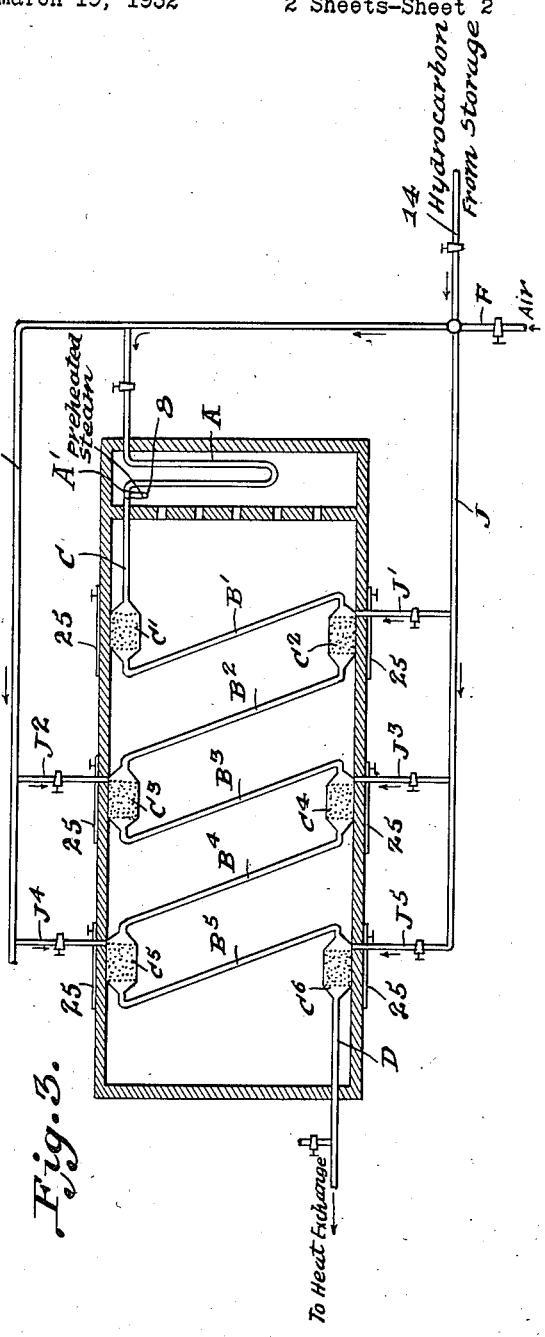
Inventors
J. A. Guyer
F. E. Frey
AND W. F. Huppke
By Robt. E. Barry
Attorney Patented Feb. 4, 1936

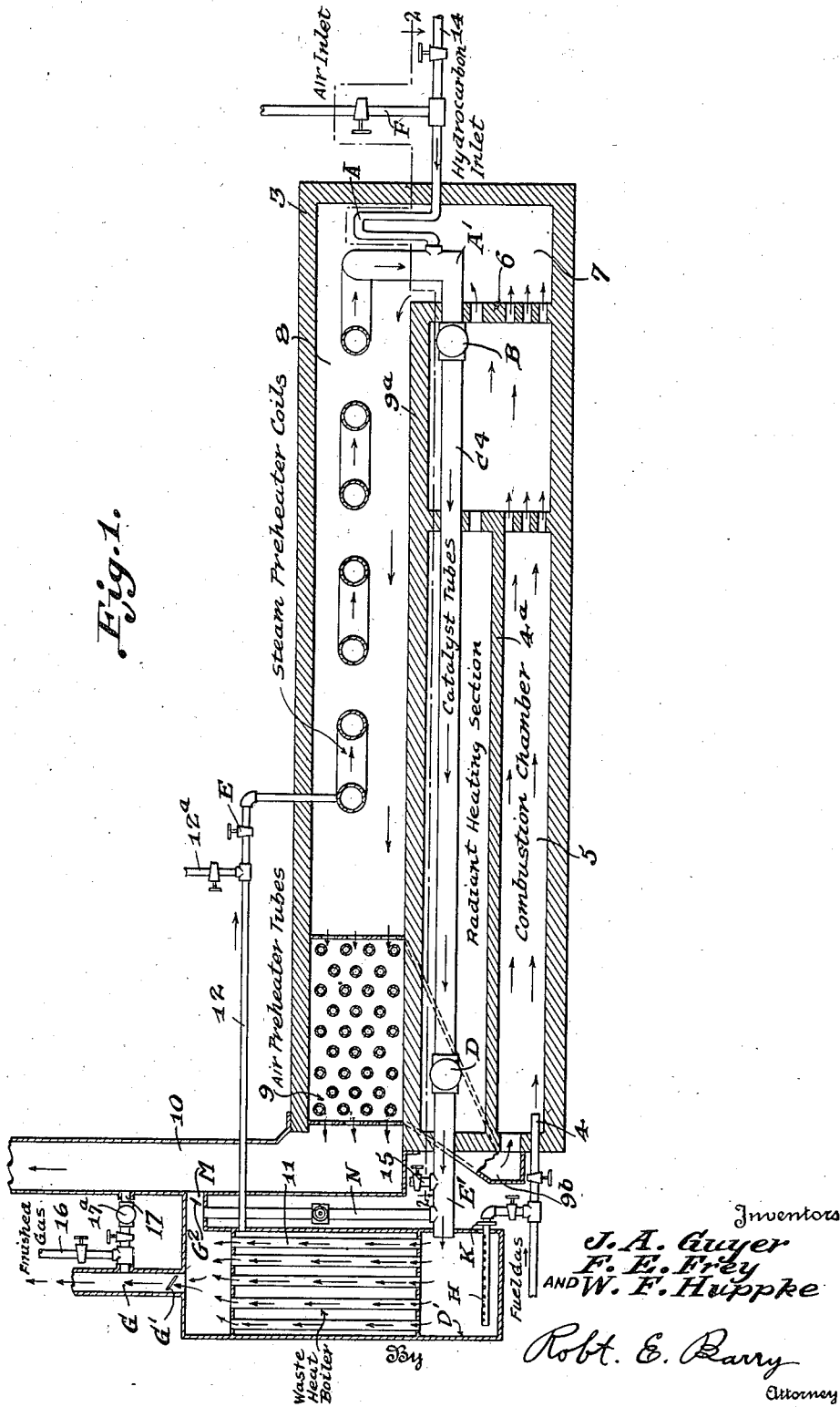

2,029,317

UNITED STATES PATENT OFFICE 2,029,317

GAS MAKING APPARATUS

Jesse A. Guyer, Frederick E. Frey, and Walter F. Huppke, Bartlesville, Okla., assignors to Phillips Petroleum Company, Bartlesville, Okla., a corporation of Delaware Application March 19, 1932, Serial No. 600,017

2 Claims. (Cl. 48—94)

This invention relates to an apparatus to be used with a process for the catalytic conversion of hydrocarbon fluids into fuel gas by reacting a hydrocarbon with steam in the presence of a catalyst at elevated temperatures.

A normal city gas plant in order to care for the peak load demand would have to be designed to carry a larger amount of gas than would be necessary for the ordinary demand. By employing this process in conjunction with a city gas plant, it is not necessary to design the regular plant to care for the peak load demand. A smaller outfit running economically at full rated capacity throughout the day will care for the ordinary load; any greater demand on the system can easily be cared for by the catalytic conversion of hydrocarbon gases. These gases may be stored as liquids under a very small pressure, thereby insuring the city plant against contingencies.

It is therefore an object of this invention to provide an improved apparatus for the commercially practical manufacture of fuel gas from hydrocarbon fluids.

A further object of the invention is to furnish an apparatus to manufacture a fuel gas by passing a limited amount of steam, together with a hydrocarbon fluid through a catalytic chamber or chambers of restricted volume.

Another object of this invention is to supply equipment to control all conditions under which this reaction is conducted, whereby it is possible to produce a gas having predetermined characteristics of thermal value and density.

A still further object is to provide an apparatus to react steam, in such a proportion to the hydrocarbon gas as to produce substantially no carbonization, thereby eliminating the difficulties of pipes clogging and inactivity of the catalysts.

Another object is to provide an apparatus of this kind, having a number of catalyst chambers arranged in parallel relation, through which the mixture of steam and hydrocarbons flows, the catalyst being exposed in units sufficiently extended to permit the introduction of the heat required by the reaction through the confining wall adjacent to the catalytic body.

A further object of the invention is to provide an apparatus by which the process may be carried out in a practical manner.

Water gas, composed of oxides of carbon and hydrogen, is commonly prepared in a state of comparative purity for use in catalytic synthesis by the interaction of hydrocarbons with steam in the presence of a suitable catalyst. A large excess of steam, moderate flow rate, and, in most cases, temperatures higher than are necessary to obtain the catalytic reaction are used to produce a gas substantially free from hydrocarbons.

We have found that if, in the manufacture of fuel gas, higher flow rates and lower steam ratios than hitherto used are employed, then well known catalysts of the Fe group activated with difficultly reducible oxides of Al, Cr, V, etc., can be used to commercial and practical advantages. The process may be applied more advantageously to the higher hydrocarbons of the paraffin type such as propane and butane, but gases containing a large proportion of the comparatively unreactive methane, as well as gases produced by cracking, which contain the simpler olefines, may be treated successfully by the process. We can also use liquid hydrocarbons which can be completely vaporized.

Under conditions where specific proportions of hydrocarbons are reacted with specific proportions of steam at an elevated temperature preferably above 600° C. in the presence of certain catalysts, the operation can be so controlled that portions of the hydrocarbons remain unreacted so that fuel gas of a desired thermal value and density can be produced.

The complete conversion of hydrocarbons into oxides of carbon and hydrogen yields a gas with a calorific value of no more than 325 B. t. u. per cubic foot. Since a calorific value in excess of 500 B. t. u. per cubic foot is usually desired in a fuel gas it is desirable that some of the hydrocarbons pass through the catalytic chamber or chambers without conversion into water gas. In the past, such catalysts as nickel, iron, and cobalt have been employed in the conversion of hydrocarbons, without steam, into hydrogen-containing gas of lower calorific value. When employed in this manner, carbon deposits are formed. Carbon formations can be tolerated in known methods in which a catalyst is supported on heat storing material disposed in a chamber into which heating gases and reactants are alternately introduced for alternate heating and gas making cycles, since restricted passages, subject to stoppage by carbon, are unnecessary. But in methods of this type, wide variations in temperatures during the gas making cycle are unavoidable and great fluctuations in the properties of the gas produced take place unless complete destruction of the hydrocarbons is intended. For producing a gas of uniform properties, a continuous process is desirable, but neither can partial combustion be used to avoid carbon, nor complete conversion into water gas be used economically, to produce a gas having a low specific gravity and at the same time an adjustable calorific value in the desired range.

In the case where a gas of higher calorific value is desired, then certain portions of the hydrocarbons must remain unreacted. In order to control these conditions, restricted passages and catalytic chambers of restricted volume must be employed. Carbon deposits formed would tend to clog these passages and inactivate the catalysts. We have found that by introducing limited amounts of steam into the reaction, the formation of carbon may be prevented, even while some of the hydrocarbons still escape the water gas conversion. This will continuously produce gases of desired predetermined calorific value. The amount of steam may vary depending on the properties of resulting gas desired. Less than one atom of oxygen in the form of water for each atom of carbon in the hydrocarbon may be used and still prevent the formation of carbon deposits.

With the foregoing objects outlined and with other objects in view which will appear as the description proceeds, the invention consists in the novel features hereinafter described in detail, illustrated in the accompanying drawings, and more particularly pointed out in the appended claims.

In the accompanying drawings,

Fig. 1 is a vertical section, partly in elevation and more or less diagrammatical, of an apparatus for carrying out the process.

Fig. 2 is a horizontal section of Fig. 1, taken on the line 2—2.

Fig. 3 is a view similar to Fig. 2, but illustrating an alternative method of installing the catalyst.

The apparatus preferably comprises a housing 3 of heat insulating material divided by a baffle plate 9a of similar material, into upper and lower chambers which are in communication with one another at one end only of the housing. At the opposite end of the housing, a suitable burner 4 extends into the lower chamber. That chamber is divided into upper and lower compartments by a horizontal plate 4a of heat conducting material. The compartment below the baffle 4a is the combustion chamber of the apparatus, and it is provided at one end with a perforated wall 6 through which gases of combustion travel to a passageway 7, that conducts the same into the upper chamber of the apparatus. In the latter chamber, a steam preheater or super-heater 8, and an air preheater 9, are positioned in serial arrangement. After the combustion gases pass through the upper chamber, they are discharged through the flue or stack 10.

The air preheated in 9 is fed by a conduit 9b into the combustion chamber.

A waste heat boiler 11, positioned at one end of the housing, is provided with an outlet conduit 12 having a control valve E. This conduit discharges steam into the preheater or super-heater 8.

The hydrocarbon fluid to be treated is introduced through a conduit 14, connected to a preheater A, arranged in the passageway 7 and discharging at A' into a manifold B. This manifold, as best shown in Fig. 2, communicates with a series of catalyst tubes C', C2, C3, C4 that extend beneath the baffle 9a and above the plate 4a.

A manifold D receives the gases from the catalyst tubes and conducts the same through conduit E' into a chamber D' in which the waste heat boiler 11 is arranged. The fuel gas or finished gas is discharged through a pipe G.

If air is to be mixed with the hydrocarbon fluid before the latter is introduced into the preheater A, said air may be introduced through a valved branch F of the inlet pipe 14.

At the point A', the preheated hydrocarbon fluid, with or without admixture of air, is admixed with the steam from the super-heater 8.

If too much steam for reaction with the hydrocarbons is produced by the waste heat, some of the steam may be discharged through a valved pipe 12a, or if desired, for reducing the amount of heat imparted to the boiler, some of the hot finished gas, instead of passing directly through the boiler 11, may be by-passed through a valved passageway N before it is introduced into the pipe G.

For the purpose of diluting the finished gas with flue gas, a valved pipe 17 connects the flue 10 with the pipe G, and a pump 17a is interposed in this conduit for forcing the flue gas into the pipe G.

Another valved pipe 16 is connected to the pipe G for use in introducing an enriching fluid, such as hydrocarbons, into the finished gas line.

A valved conduit 15 leads into the manifold D between the catalyst tubes and the chamber D' for the purpose of introducing a hydrocarbon enriching fluid into the hot fuel gas before the latter is cooled by imparting some of its heat to the boiler 11. In this way, the enriching fluid may be cracked somewhat by the heat of the hot fuel gas leaving the catalyst tubes.

The catalyst in the tubes C', C2, C3 and C4 preferably consists of wire screens of any suitable cross section. For instance, each screen may be of substantially the same length as the tube within which it is placed, and may be M-shaped in cross section. Such screens may be of nickel, made active by oxidizing and then reducing to produce a roughened condition. Afterwards, the screen is coated with a solution of a nickel and aluminum nitrates, which, when dried and heated, results in the formation of a catalytic nickel promoted by alumina upon subsequent treatment with a heated hydrocarbon atmosphere.

In starting the process, the boiler 11 may be heated by a burner H, and at such time as it is desirable to pass the combustion gases from chamber D' into the stack 10, such chamber is connected by a passageway M with such stack, suitable dampers G' and G2 being arranged respectively in the pipe G and in the passageway M.

Instead of employing catalyst tubes of the type shown in Figs. 1 and 2, we can use a single tube with catalytic chambers interposed therein in spaced relation, as shown in Fig. 3. In this arrangement, the single tube will be positioned below the baffle 9a, and at substantially the same elevation as the catalytic tubes in Figs. 1 and 2. Referring to Fig. 3, it will be noted that the hydrocarbon fluid introduced through the pipe 14 may be mixed with air from the branch F before entering the preheater A. As in Figs. 1 and 2, steam from the preheater 8 is mixed with the hydrocarbons or hydrocarbons and air at the point A', and then the mixture enters the catalyst tube C. This tube is made up of a number of cross pipes B', B2, B3, B4, B5, which lead to and from catalyst chambers C', C2, C3, C4, C5, and C6. Each of these chambers preferably contains a catalyst composed of metals of the iron group activated with difficulty reducible metallic oxides. For example, it may be nickel activated with an alumina.

The catalyst may also be of pumice or porcelain crushed and screened from 3 to 6 mesh to the inch size, and impregnated with nickel and aluminum nitrates which are decomposed by calcination at low red heat to give the oxides. For the purpose of holding such a catalyst in position, a perforated alloy plate is spot welded into place at one end of the chamber. Afterwards, the catalyst is put in and held in place by a second perforated alloy plate.

In order that the catalyst chambers may be accessible, openings are placed in the opposite walls of the housing 3 where the catalyst chambers are located, and these openings are normally closed by any suitable doors 25.

As in Figs. 1 and 2, the fuel gas leaving the last one of the catalyst chambers C6, enters a pipe D which conducts the same to the boiler 11, (Fig. 1).

If desired, hydrocarbon fluid, with or without admixture with air, can be fed by way of pipes J and valved branch pipes J', J2, J3, J4 and J5, into the inlet ends of the catalyst chambers.

If the catalyst sections are arranged along the walls of the housing, the small pipes J', J2, J3, J4 and J5 for the addition of hydrocarbons progressively in small portions, may be run through the furnace in such a way that they would not be exposed to excessive temperatures so that undue cracking is prevented.

In putting the apparatus in operation, steam is first generated by heating boiler 11 by the combustion of fuel gas in the chamber D'. Air for combustion here is admitted through gate controlled opening K, and the products of combustion are allowed to pass through the boiler tubes and into the stack 10 through opening M, while the valved pipe G remains closed to prevent the passage of combustion gases into the fuel gas exit.

When the catalyst tubes have been heated somewhat by firing combustion chamber 5, steam is admitted to said tubes by opening valve E, firing through burner H is discontinued, gate K and damper G2 are closed, and, when the operating temperature is approached, hydrocarbon fluid is admitted through inlet 14. The finished gas is allowed to pass out through pipe G.

In the operation of the apparatus as described, the incoming gases to be treated, such as propane or butane, or mixtures of these, enter through pipe 14 in liquid or gaseous form. Ordinarily, they will pass through heater A where they will be heated by the combustion gases.

After being heated by the heat exchanger A, the hydrocarbons pass by point A', where the gases are mixed with a controlled quantity of steam. This mixture is led into catalytic tubes or chambers.

The reaction is extremely endothermic, requiring the addition of large quantities of heat to the reaction chambers. Since the reaction is strongly endothermic, the heat withdrawn at the catalyst lowers the temperature to such a degree that the reaction ceases when conversion is only partly complete. This can be prevented by introducing additional heat into the catalyst or by preheating the gases to an impractically high temperature. We have discovered that the use of excessive preheat temperatures can also be avoided by a method for which the catalyst tube shown in Fig. 3 is used. The gaseous mixture, to undergo conversion, is heated above minimum reaction temperature to only a fraction of the extent necessary to subsequently cause complete reaction, after which on passing through a portion of the catalyst bed, a partial reaction takes place, the temperature falling to a minimum reaction temperature. The gas mixture, after undergoing partial conversion in this manner, must be heated to undergo a further partial conversion. Additional partial conversions may be subsequently applied until the desired reduction in calorific value is obtained.

The process in the apparatus may be conducted at about 650° to 800° C., but best results are obtained in most cases within a range of 700°–750° C. We have found such temperatures can be maintained easily if the catalyst is divided into several portions which are so arranged that the reacting gases pass through them in parallel relation or successively. The catalyst segments in Fig. 3 are connected in the furnace by a piece of tubing of sufficient length so that the heat to be used in the reaction is taken up by radiation and conduction from the furnace. By regulating the furnace temperature, the heat loss due to the endothermic nature of the reaction may be compensated by the connecting tubes, and the temperature of all the catalyst bodies kept high enough to permit reaction.

After the mixture has reacted to the desired degree in the catalytic chambers, it passes out through pipe E' to heat exchanger 11 to heat the incoming water and from there the reacted gas passes through pipe G where it may be diluted by flue gases. If desired, it may be diluted by air, combustion products, or other diluent gases, or enriched with hydrocarbons, depending on the calorific value and density desired. The finished product leaves pipe G to the necessary source for use as fuel gas.

It may be desired to divert the hydrocarbons directly into the catalytic chambers. In this event, the valves in branch pipes J', J2, J3, J4 and J5, (Fig. 3), are partially opened, and the hydrocarbons pass directly into the catalytic chambers. This will avoid excessive cracking prior to catalytic conversion when the more unstable hydrocarbons are treated. Air may be introduced to supply heat to the several catalyst chambers alone or in admixture with hydrocarbons.

The combustion gases, assisted by radiation from baffle 4a, function to maintain the temperature of the reacting mixture flowing through the catalytic chambers, and from there pass up into the stack 10.

As example of the application of the process to be conducted in the apparatus, the following data are cited. In practicing the invention, an apparatus essentially of the type shown in Figs. 1 and 2 was used. The catalyst consisted of 150 square feet of nickel screen in strips 12 feet long and 16 inches wide, folded longitudinally to permit their introduction into chromium alloy steel tubes C', C2, C3, C4 of about 3½ inches in internal diameter. The tubes were disposed in the furnace which maintained in the tubes the average temperature shown in the following table in the neighborhood of the catalyst. A mixture of steam and butane was passed at a uniform rate through the tubes wherein conversion into gas of lower specific gravity and calorific value was produced. The catalyst screen was activated before practicing the process by heating the screen three hours in air at 800° C. The oxidized surface was then reduced to a rough but tenacious coating by reducing with hydrogen at 400° C., after which a strong aqueous solution of nickel and aluminum nitrates in the molecular ratio of 1 to 2 was applied. A clean gas, free from tar, was produced continuously over a long period without the formation of carbon.

The following shows the results:

| Temperature degrees centigrade | 820 | 760 | 715 | 740 |
|---|---|---|---|---|
| Butane—cubic feet per hour | 366 | 960 | 880 | 1425 |
| Steam—pounds per hour | 106 | 150 | 205 | 250 |
| Finished gas—cubic feet per hour | 3000 | 5200 | 2310 | 5240 |
| Finished gas—specific gravity | .45 | .52 | .86 | .70 |
| Finished gas B. t. u. per cubic foot | 453 | 654 | 1270 | 923 |
| Finished gas analysis: | | | | |
| Carbon dioxide | 7.2 | 6.5 | 4.6 | 5.0 |
| Carbon monoxide | 18.2 | 14.9 | 10.4 | 14.2 |
| Hydrogen | 55.4 | 46.4 | 38.1 | 42.4 |
| Ethylene | 4.3 | 6.4 | 4.5 | 6.8 |
| Propylene and higher olefines | | 3.2 | 8.8 | 6.3 |
| Methane | 14.9 | 15.0 | | |
| Ethane | | 7.6 | | 18.0 |
| Propane | | | 33.6 | 17.4 |

Both increased flow rate and decreased catalyst temperature decrease the extent of conversion to give a resultant increase in calorific value. The properties of the gas may also be modified by the admixing of other gases.

In case it is desired to decrease the calorific value and increase the specific gravity of the gas, air, combustion gases, or other suitable diluent gases can be added after the gases come out of the reaction chamber. In case it is desired to have a gas of very high calorific value and comparatively low gravity, hydrocarbon can be added through 16 to the finished gas after it leaves the reaction chamber. Simpler paraffins may also be added through 15 to the hot gas leaving the catalyst. This would effect considerable cracking of the hydrocarbon, and also a large increase in volume.

From the foregoing it is believed that the construction, operation and advantages of our improved apparatus may be readily understood by those skilled in the art, and it is apparent that changes may be made in the details disclosed, without departing from the spirit of the invention, as expressed in the claims.

What we claim and desire to secure by Letters Patent is:

1. Gas generating apparatus particularly adapted for use in connection with highly endothermic catalytic gas producing reactions, said apparatus comprising a combustion chamber, a radiant heating chamber adjacent to but separated from said combustion chamber, a reaction tube extending through said radiant heating chamber, said tube comprising spaced catalyst containing chambers and intermediate connecting conduits, said conduits being of such length as to enable the reaction mixture passing therethrough between catalyst chambers to absorb sufficient heat from said radiant heating chamber to enable the reaction to proceed, in part at least, in said chambers, whereby excessive preheat temperatures of said reaction mixture may be avoided, and additional means for selectively controlling the temperature of said mixture in said conduits.

2. Gas generating apparatus particularly adapted for use in connection with the endothermic generation of gas, said apparatus comprising a source of heat, a reaction tube in indirect heat exchange relationship with said source of heat, said tube comprising a plurality of spaced reaction chambers and intermediate connecting portions, whereby the reaction mixture is adapted to pass through said chambers in succession, said connecting portions being of such length as to enable the reaction mixture passing therethrough to absorb sufficient heat from said heat source to enable the gas generation to proceed, in part at least, in said reaction chambers, and means for introducing hydrocarbons and the like into said mixture progressively as it passes through the apparatus.

JESSE A. GUYER.
FREDERICK E. FREY.
WALTER F. HUPPKE.